United States Patent [19]

Diekelman

[11] Patent Number: 5,612,701
[45] Date of Patent: Mar. 18, 1997

[54] ADAPTIVE BEAM POINTING METHOD AND APPARATUS FOR A COMMUNICATION SYSTEM

[75] Inventor: Dennis P. Diekelman, Tempe, Ariz.

[73] Assignee: Motorola, Inc., Schaumburg, Ill.

[21] Appl. No.: 529,829

[22] Filed: Sep. 18, 1995

[51] Int. Cl.[6] ............................... H04B 7/185
[52] U.S. Cl. .................. 342/354; 342/352; 455/12.1; 455/33.1
[58] Field of Search ................ 342/354, 352; 455/33.1, 13.1, 13.3, 12.1

[56] References Cited

U.S. PATENT DOCUMENTS

| | | | |
|---|---|---|---|
| 4,813,036 | 3/1989 | Whitehead | 370/57 |
| 5,408,237 | 4/1995 | Patterson et al. | 342/354 |
| 5,410,731 | 4/1995 | Rouffet et al. | 455/13.1 |
| 5,415,368 | 5/1995 | Horstein et al. | 244/158 R |
| 5,439,190 | 8/1995 | Horstein et al. | 244/158 R |
| 5,465,096 | 11/1995 | Nawata | 342/354 |

*Primary Examiner*—Thomas H. Tarcza
*Assistant Examiner*—Dao L. Phan
*Attorney, Agent, or Firm*—Sherry J. Whitney

[57] ABSTRACT

A method and apparatus for allocating service beams (72, 76) to communication units (80-84) (CUs) ascertains (124) the location of a CU (81) attempting to access the communication system (30), and determines (126) whether a currently active service beam (72) is capable of providing service to the CU (81). If so, a ground position aim point (90) is determined (134), and the active service beam (72) is steered (142) to the ground position aim point (90). If not, a new service beam (76) is provided (132) to the CU (83). When a call is terminated (162), a new ground position aim point (92) is determined (168) and the service beam (72) is steered (170) to the new ground position aim point (92). If no remaining CUs are being serviced by the service beam, the service beam is deactivated is (166).

33 Claims, 8 Drawing Sheets

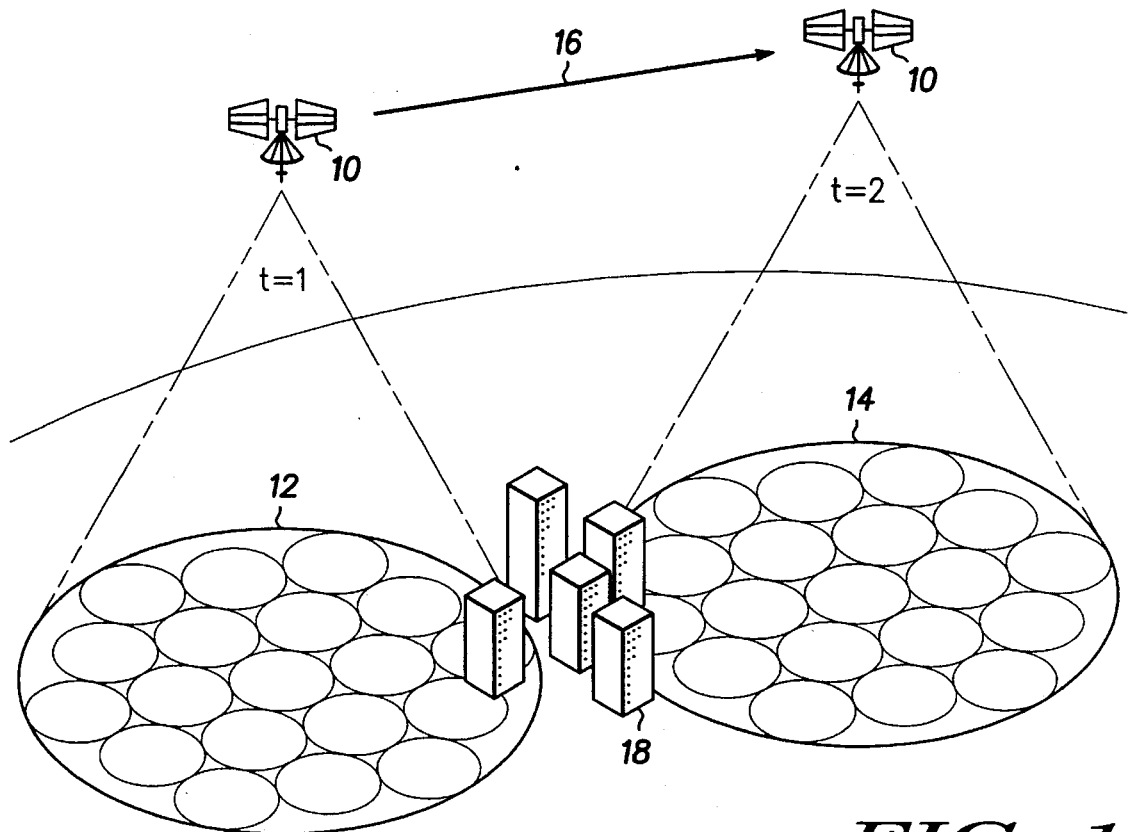
— PRIOR ART — FIG. 1
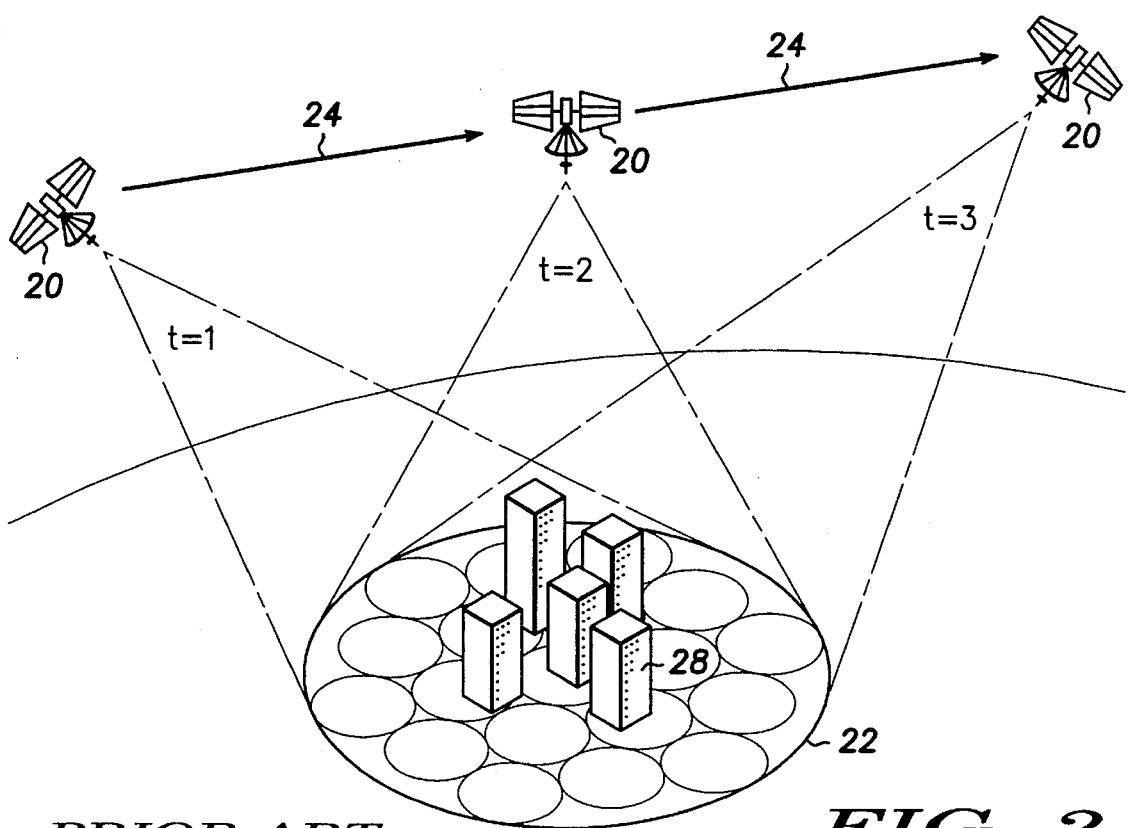
— PRIOR ART — FIG. 2

ADAPTIVE BEAM POINTING METHOD AND APPARATUS FOR A COMMUNICATION SYSTEM

FIELD OF THE INVENTION

This invention relates generally to radio-frequency (RF) telecommunications and, more particularly, to satellite-based RF telecommunications.

BACKGROUND OF THE INVENTION

In a cellular communication system, a subscriber unit communicates within a "cell" or "beam" which contains multiple channels. When a subscriber unit exits a first cell, the call is handed off to another cell which is projected by the same or a different cellular antenna. Channel frequencies within adjacent cells are typically selected by the communication system so that they do not interfere with each other.

Prior art terrestrial cellular communication systems are described in William C. Y. Lee, Mobile Cellular Telecommunications (2d ed. 1995). Prior art terrestrial cellular communication systems provide communication channels to subscriber units by projecting fixed cellular beams from cellular antennas located on 30–100 foot towers. A cell's size depends on power, antenna type, geometry, and local geography. The more power emitted by the antenna, the greater the size of the cell. However, increased power produces more interference. An omnidirectional, omnicell antenna projects an ideally circular cell around the cellular antenna. A directional antenna allows a cell pattern to extend in a planned direction relative to the antenna.

Terrestrial cellular systems have several disadvantages. For example, only limited service areas are feasible because of the necessity of antenna towers. With antenna ranges of twenty miles or less, coverage of rural and remote areas would not be cost-effective. Also, once an omnidirectional or directional antenna is set up, only a hardware change can affect the shape or location of the cell or the frequencies assigned to the communication channels.

Satellite cellular communication systems have been proposed to overcome some disadvantages of terrestrial cellular systems. For example, a satellite cellular communication system using low earth orbit (LEO) satellites can provide a much greater service area than a terrestrial system because the satellites can project cells toward the entire surface of the earth. Several proposed satellite cellular systems project "satellite-fixed" cells toward the surface of the earth. FIG. 1 illustrates the motion of a satellite-fixed cellular footprint relative to a hypothetical urban area 18 as a prior-art satellite 10 progresses in its orbit. At time=1, the satellite's cellular footprint is projected toward area 12. At time=2, after satellite 10 has traveled along orbital path 16, the satellite's cellular footprint is projected toward area 14. Relative to satellite 10, the direction that the cellular footprint is projected does not change. However, relative to the earth, the cellular footprint travels smoothly over the earth's surface as satellite 10 progresses in its orbit.

During a typical conversation, several cells and/or satellites might pass over a particular subscriber unit. Because of the relative movement of the cells to the subscriber units, frequent cell-to-cell handoffs are required. In addition, when a satellite moves out of range of a particular satellite, a satellite-to-satellite handoff is required. These frequent handoffs add a level of complication to the management of the system.

Earth-fixed satellite cellular beams have also been proposed. In a system employing earth-fixed satellite cellular beams, the satellites steer their antennas to project a footprint toward a particular region of the earth. These regions are predetermined by the system and typically represent high-demand areas (e.g., major metropolitan areas or continental regions). FIG. 2 illustrates an earth-fixed cellular footprint relative to a hypothetical urban area 28 as a prior-art satellite 20 progresses in its orbit. At time=1, time=2, and time=3, satellite 10 projects its cellular footprint toward area 22. As satellite 20 moves along its orbital path 24, the cellular footprint is "steered" either electrically or mechanically toward area 22. The shape of area 22 might vary as satellite 20 moves, but the direction of the cellular footprint projection remains relatively constant. The shape of area 22 is nearly circular when satellite 20 is at a high angle of elevation (e.g., at time=2). When satellite 20 projects the satellite footprint from a low angle of elevation (e.g., at time=1 and time=3), however, the shape of the satellite footprint and the cells contained within the footprint are elliptical. Thus, during the pass of a satellite, the shape of a particular cell changes from an ellipse to a circle and back to an ellipse.

Examples of prior art, earth-fixed satellite cellular systems are described in U.S. Pat. Nos. 5,415,368 and 5,439,190, where Horstein, et al. disclose a "coordinated boresight steering" method where the communication system determines antenna focal directions for projection of a satellite footprint for a predetermined orbital period. The focal directions are adjusted during the orbital period so that the footprint is steered toward a particular geographical region during the orbital period. Another example of an earth-fixed satellite cellular system is described in U.S. Pat. No. 5,408,237, Patterson, et al.

Earth-fixed systems can minimize cell-to-cell handoffs and can simplify satellite-to-satellite handoffs. However, a drawback to earth-fixed satellite cellular systems is that these systems do not compensate for demand variations. The action in which a footprint is projected is predetermined. Thus, these systems cannot react in real time to varying subscriber demands. Although an earth-fixed cellular system can target a high demand area, each cell has a fixed capacity. Thus, only a number of subscribers not exceeding that cell's capacity can use the system at one time.

Another negative aspect to earth-fixed systems is that they continuously project RF energy toward the earth, whether or not communication channels are being used. This results in unnecessary RF interference over a large area.

A drawback to both terrestrial and satellite prior art systems is that they waste power by projecting a fixed footprint of cells toward a region, without taking user demand into account While some cells can see very high demand, other cells can see little or no demand. Thus, wasted power is expended in projecting cells toward areas with little or no demand. Power considerations are especially important in satellite communication systems because of limited battery storage capabilities of the satellites.

What is needed is a method and apparatus to increase the traffic-carrying capacity of a cellular communication system while minimizing power consumption and unnecessary RF interference. Further needed is a method and apparatus to better service geographically varying subscriber demands and to simplify handoff problems.

BRIEF DESCRIPTION OF THE DRAWINGS

FIG. 1 illustrates the motion of a satellite-fixed cellular footprint relative to a hypothetical urban area as a prior-art satellite progresses in its orbit;

FIG. 2 illustrates an earth-fixed cellular footprint relative to a hypothetical urban area as a prior-art satellite progresses in its orbit;

DETAILED DESCRIPTION OF THE DRAWINGS

The method and apparatus of the present invention increase the traffic-carrying capacity of a cellular communication system while minimizing power consumption. Further, the method and apparatus of the present invention better service geographically varying subscriber demands and simplify handoff problems. While the present invention is described in the context of a satellite cellular system, the present invention can also be applied to terrestrial-based communication systems.

Figure 3:
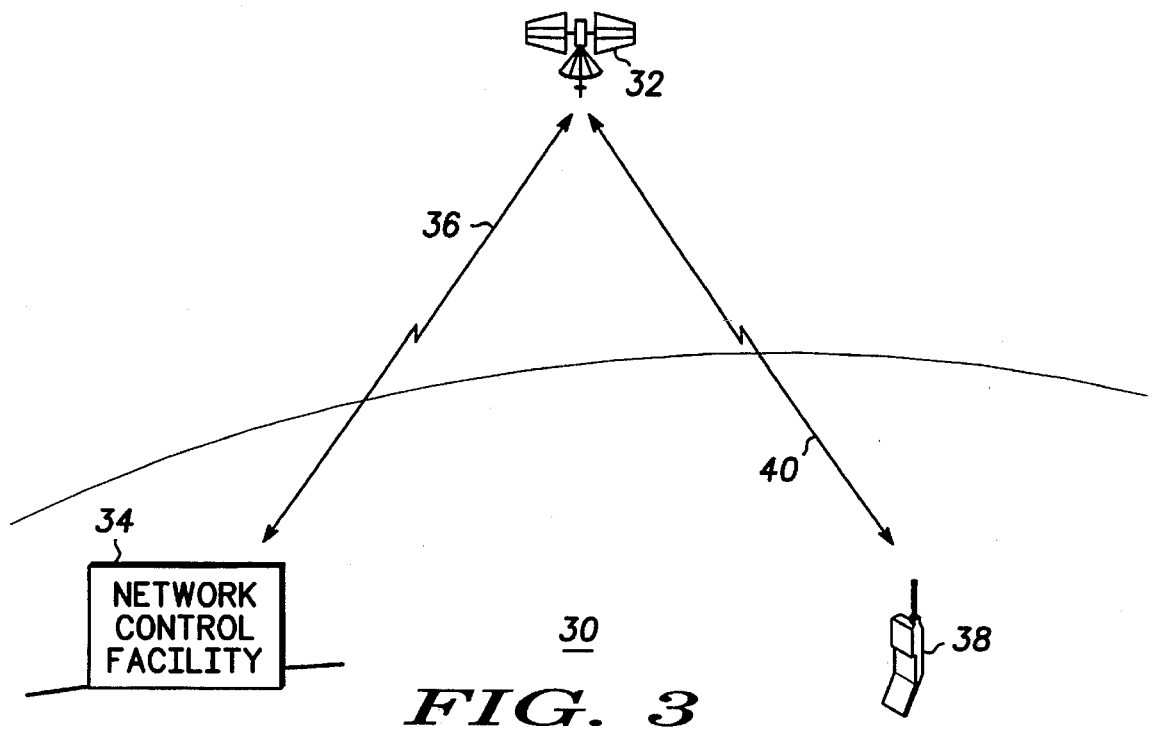
FIG. 3 illustrates a satellite, cellular communication system in accordance with a preferred embodiment of the present invention.

FIG. 3 illustrates a satellite, cellular communication system 30 in accordance with a preferred embodiment of the present invention. System 30 includes at least one satellite 32, Network Control Facility (NCF 34, and at least one Communication Unit (CU) 38. Satellite 32 communicates with CU 38 over link 40 after CU 38 makes a service request to satellite 32. In a preferred embodiment, link 40 is an RF link. As described in conjunction with FIGS. 4–13, satellite 32 provides link 40 within a service beam that satellite 32 selectively steers to encompass CU 38.

Satellite 32 communicates with NCF 34 over link 36. NCF 34 desirably receives telemetry from satellite 32 and controls operations of satellite 32. In a preferred embodiment, NCF 34 also performs computations to determine how satellite 32 should provide and steer service beams to best service CUs 38, and sends operational instructions to satellite 32. The functionality of NCF 34 is described in detail in conjunction with FIGS. 10, 11 and 13.

Figure 4:
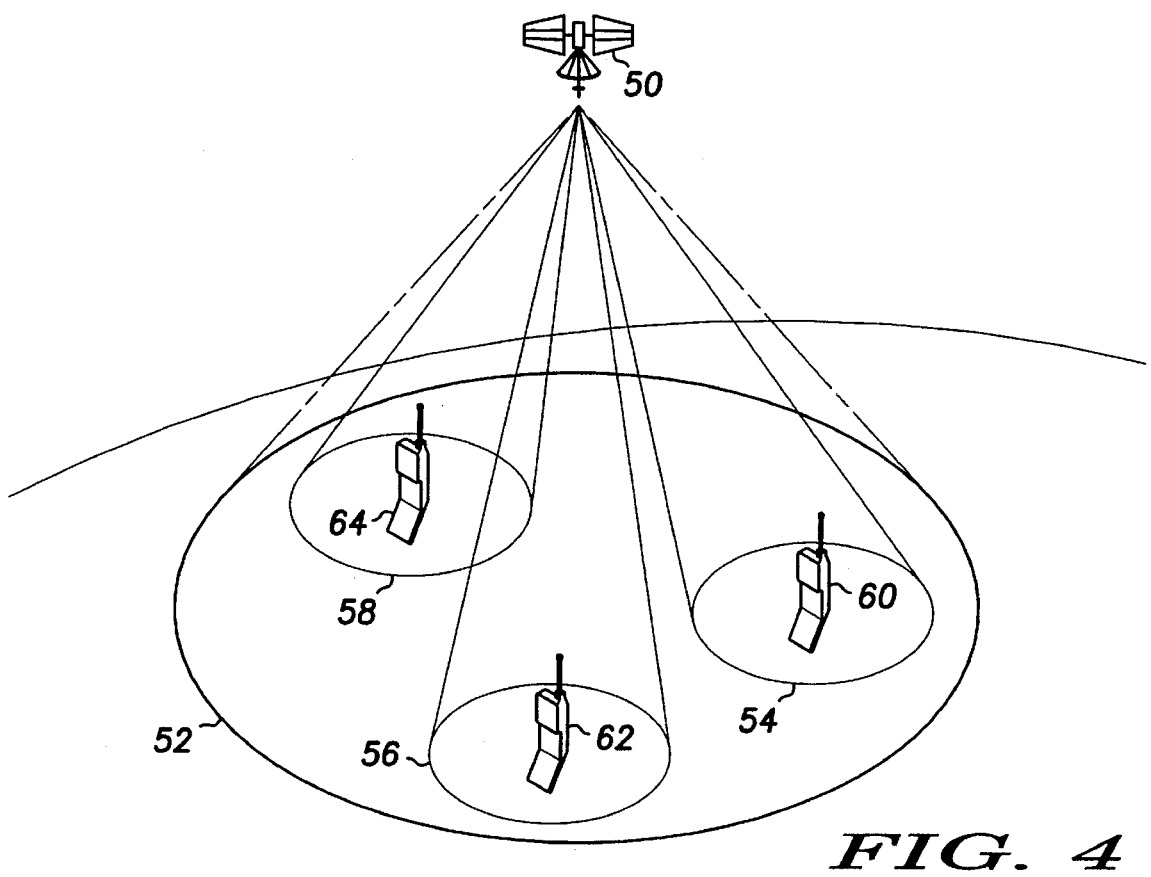
FIG. 4 illustrates multiple satellite service beams pointed towards multiple communication units in accordance with a preferred embodiment of the present invention.

FIG. 4 illustrates multiple satellite service beams 54, 56, 58 pointed towards multiple CUs 60, 62, 64 in accordance with a preferred embodiment of the present invention. In a preferred embodiment, satellite 50 projects two types of communication beams. Access beam 52 covers a wide area and is used by CUs 60, 62, 64 to gain access to the communication system. Typically, access beam 52 does not handle service communications traffic. Access beam 52 can be a satellite-fixed beam, or can be a steerable beam.

Satellite 50 also provides service beams 54, 56, 58 which are used after system access is allowed. Service beams 54, 56, 58 handle communications traffic during a call between any two CUs 60, 62, 64. In FIG. 4, only one CU 60, 62, 64 is shown in each service beam 54, 56, 58 for ease of description. However, multiple CUs 60, 62, 64 can be serviced by each service beam 54, 56, 58 at a particular time. As shown in FIG. 4, only one CU 60 exists within an area that can be served by a single service beam 54. Thus, the center of service beam 54 is steered by satellite 50 directly toward CU 60. Similarly, the center of service beam 56 is steered directly toward CU 62 and the center of service beam 58 is steered directly toward CU 64. As will be illustrated in FIGS. 5–9, when more CUs are within range of a particular service beam request service, the particular service beam is steered toward a ground position aim point that will allow the particular service beam to provide service to multiple CUs within its range. In a preferred embodiment, this ground position aim point is the centroid of CUs which the particular service beam supports, where the centroid is a ground location at a mathematical center of the CU locations.

Service beams 54, 56, 58 are steered independently of each other on a real-time basis as traffic demands change. Independently steering the service beams, rather than the prior-art method of steering the entire cellular footprint, allows the system to better target high-demand areas. In addition, service beams 54, 56, 58 are activated only when there is demand. Thus, the method and apparatus of the present invention conserves energy, unlike prior-art systems which keep all cells of a cellular footprint active when servicing an area.

FIGS. 5–9 illustrate the motion of service beams as the centroids move for multiple users within the service beams in accordance with a preferred embodiment of the present invention. FIGS. 5–9 exemplify aerial views of approximate ground coverage areas of service beams. Although the service beams are shown to be circular, their actual shape will vary depending on the satellite's angle of elevation and the antenna shape. The communication system desirably can calculate the shape of any given service beam to a relatively high degree of accuracy.

Figure 5:
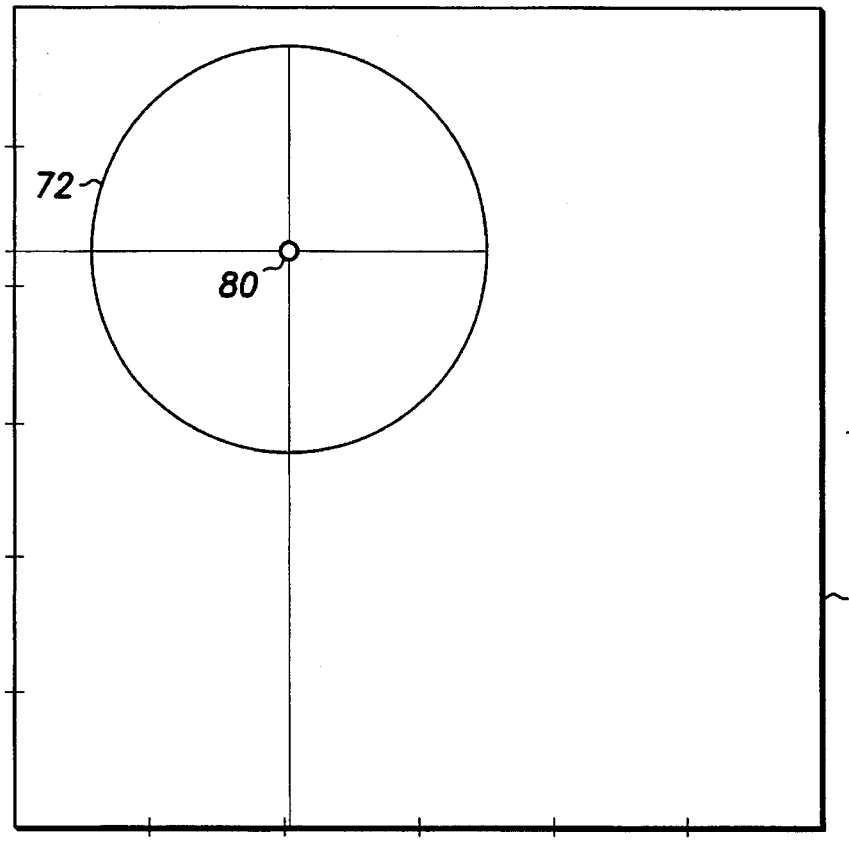
FIGS. 5–9 illustrate the motion of service beams as the centroids move for multiple users within the service beams in accordance with a preferred embodiment of the present invention.

FIG. 5 illustrates a first service beam 72 provided to a first CU 80. Area 70 represents a geographical area on the surface of the earth. At a first time, first CU 80 requests access to the communication system. The system then ascertains the location of first CU 80. In a preferred embodiment, when first CU 80 is a mobile communications unit, first CU 80 transmits its location to the satellite after determining its location using a geolocation device or other location determination device. Where first CU 80 is not frequently relocated (e.g., CU 80 is part of a fixed-installation), the system can maintain a record of the location of first CU 80, and it might not be necessary for first CU 80 to transmit its location each time it requests access to the system. How the location of first CU 80 is determined is not crucial to the method and apparatus of the present invention.

When no other active CUs are in the same area, a satellite within range of CU 80 projects the center of first service beam 72 toward first CU 80. As the satellite moves in its orbit, the satellite steers the boresight of first service beam 72 toward first CU 80.

Figure 6:
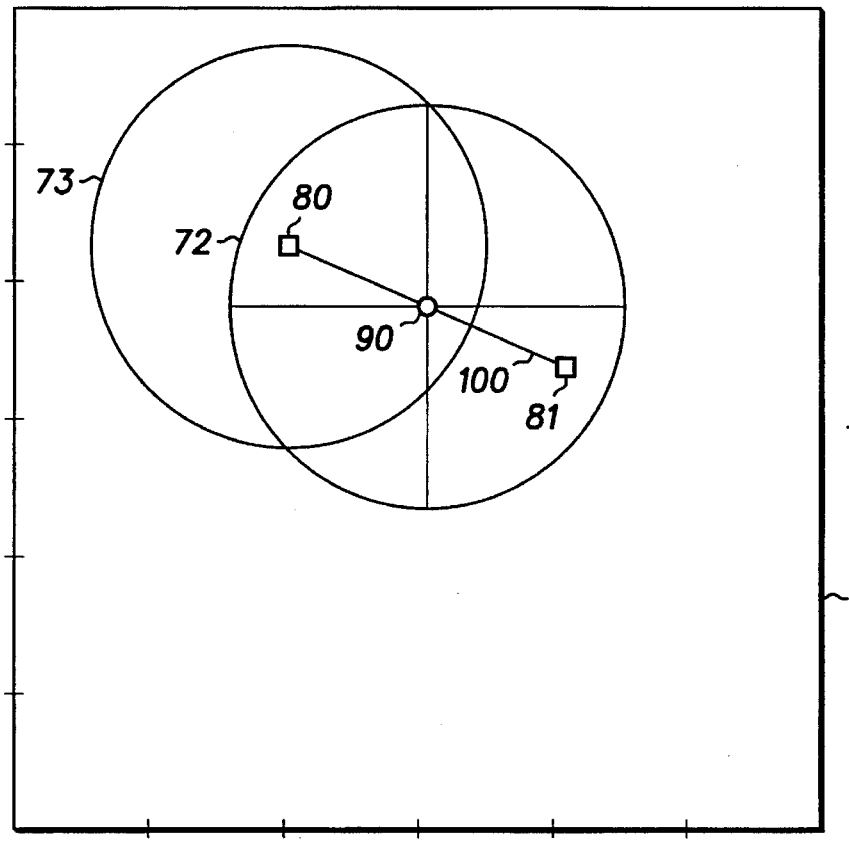

FIG. 6 illustrates the motion of the first service beam 72 after second CU 81 requests access to the communication system. At a second time, second CU 81 requests access to the communication system. The system then ascertains the location of second CU 81 and determines whether fast service beam 72 can be moved to service both first CU 80 and second CU 81 simultaneously. If so, the system determines a ground position aim point at which the center of the first service beam 72 will be pointed. In a preferred embodiment, the ground position aim point is the centroid 90 along the line 100 between first CU 80 and second CU 81. In alternate embodiments, the ground position aim point can be any other point that enables the first service beam 72 to service both CUs 80, 81. The satellite then steers the center of fast service beam 72 toward centroid 90. Circle 73 illustrates the prior location of first service beam 72 to clearly illustrate the movement of first service beam 72 in response to user demand.

Figure 7:
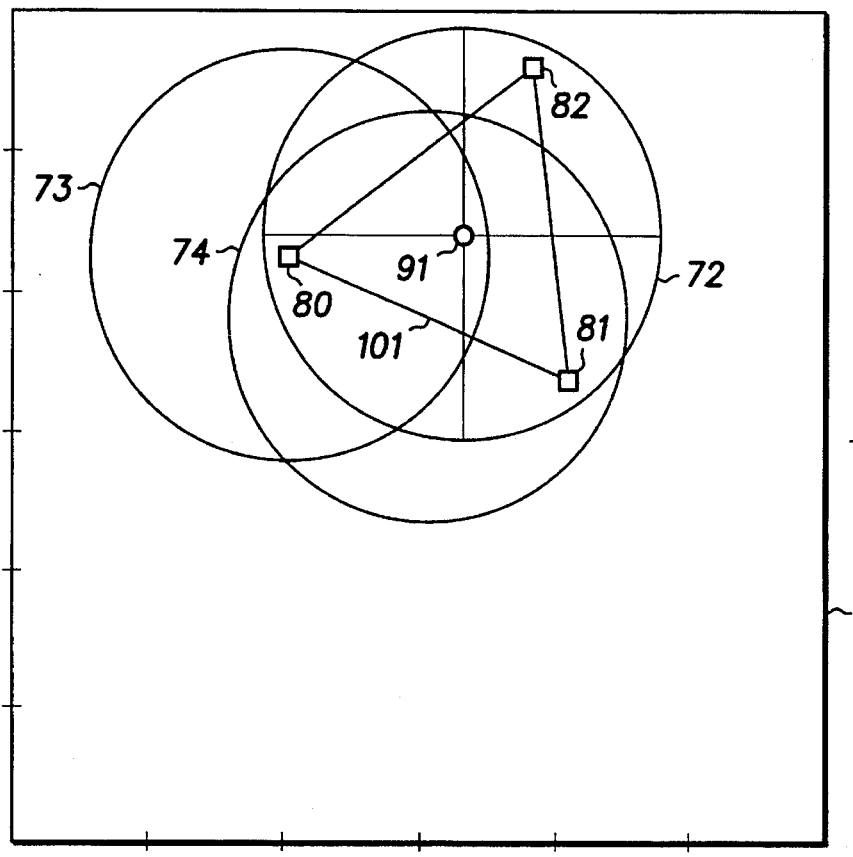

FIG. 7 illustrates the motion of the first service beam 72 after third CU 82 requests access to the communication system. At a third time, third CU 82 requests access to the communication system. The system then ascertains the location of third CU 82 and determines whether first service beam 72 can be moved to service first CU 80, second CU 81, and third CU 82 simultaneously. If so, the system determines the centroid 91 within the triangle 101 formed by fast CU 80, second CU 81, and third CU 82. The satellite then steers the center of first service beam 72 toward centroid 91. Circles 73 and 74 illustrate the prior locations of first service beam 72 to clearly illustrate the movement of fast service beam 72 in response to user demand.

Figure 8:
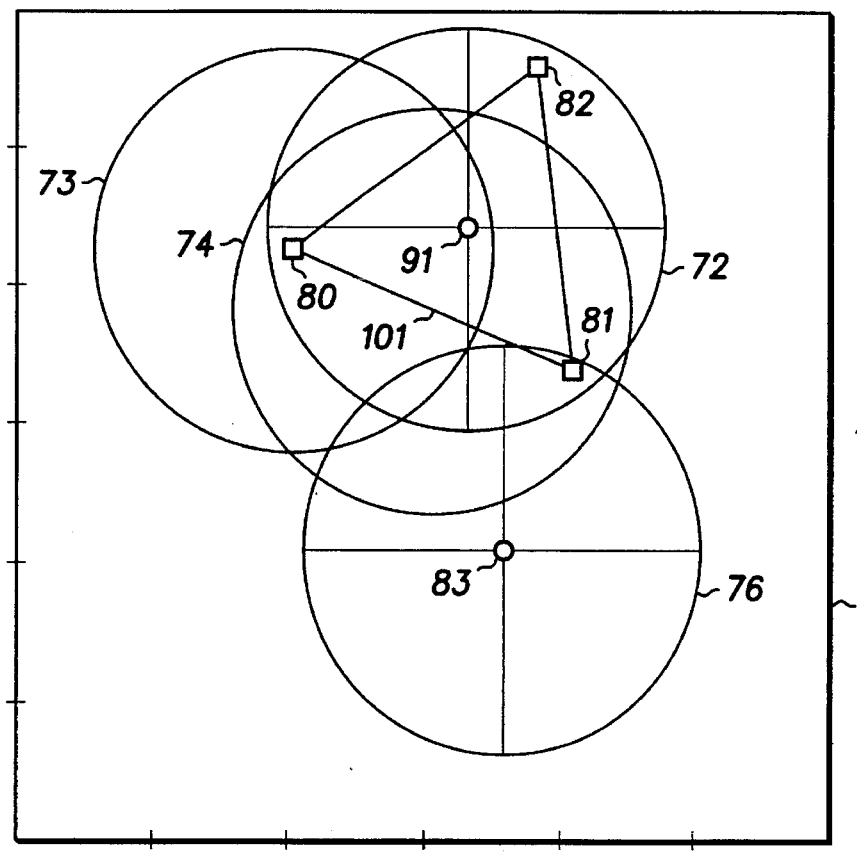

FIG. 8 illustrates activation of a second service beam 76 after fourth CU 83 requests access to the communication system, where fourth CU 83 cannot be serviced by first service beam 72. At a forth time, forth CU 83 requests access to the communication system. The system then ascertains the location of forth CU 83 and determines whether first service beam 72 can be moved to service fast CU 80, second CU 81, third CU 82, and forth CU 83 simultaneously. In this case, fast service beam 72 cannot be moved to service all CUs 80–83. In a preferred embodiment, the system provides service to fourth CU 83 by projecting the center of second service beam 76 toward forth CU 83. Second service beam 76 can be projected by the same or a different satellite. In an alternate embodiment, the system can determine one or more of the first CU 80, second CU 81, or third CU 82 to discontinue servicing, and can move first service beam 72 to service fourth CU 83.

Where multiple adjacent or overlapping service beams 72, 76 are provided, the system allocates communication channels within the adjacent beams such that they will not interfere with each other. In some situations, two service beams that originally did not intersect might begin to overlap as the centroids of the service beam users converge. The system determines whether communication channels of the newly overlapping service beams will interfere with each other. If so, the system reallocates communication channels for either or both of the overlapping service beams.

Figure 9:
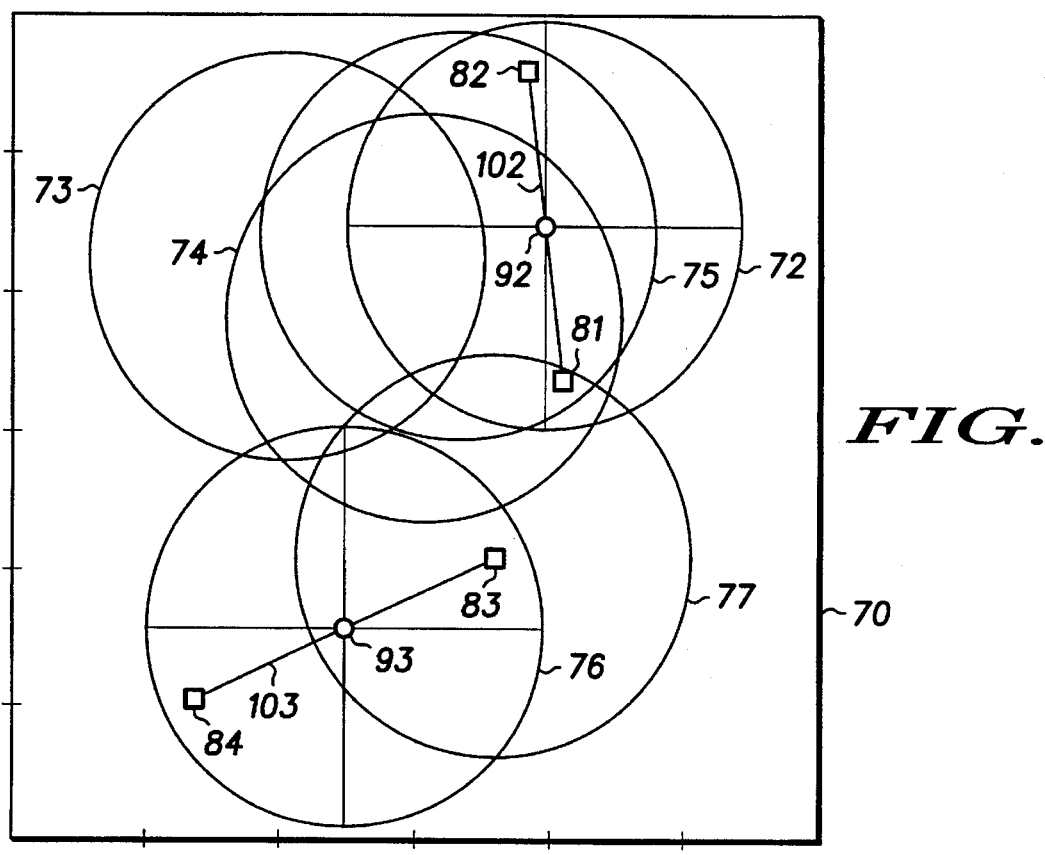

FIG. 9 illustrates the motion of first service beam 72 after first CU 80 terminates its call, and the motion of second service beam 76 after fifth CU 84 requests access to the communication system. At a time when first CU 80 terminates its call, the system recalculates the centroid 92 of CUs 81, 82 that first service beam 72 continues to service. In this case, centroid 92 lies along line 102 between second CU 81 and third CU 82. The satellite then steers the center of first service beam 72 toward centroid 92.

After fifth CU 84 requests access to the communication system, the system ascertains the location of fifth CU 84 and determines whether second service beam 76 can be moved to service both forth CU 83 and fifth CU 84 simultaneously. If so, the system determines the centroid 93 along the line 103 between forth CU 83 and fifth CU 84. The satellite then steers the center of second service beam 76 toward centroid 93. Circles 73–75 and 77 illustrate the prior locations of first service beam 72 and second service beam 76, respectively.

In a communication system where many users request service at nearly the same time, the processes illustrated by FIGS. 8 and 9 can be collapsed. For example, where multiple new users almost simultaneously request service in an area where a new service beam is required, the system can calculate the centroid of the new users and immediately project the new service beam toward the centroid, rather than projecting the beam toward one user (FIG. 8) and then moving the beam to the centroid (FIG. 9).

FIGS. 5–9 demonstrate that, unlike prior an systems, the method and apparatus of the present invention is able to accurately target high demand areas in real time, and conserve energy by activating service beams only when demand exists.

Figure 10:
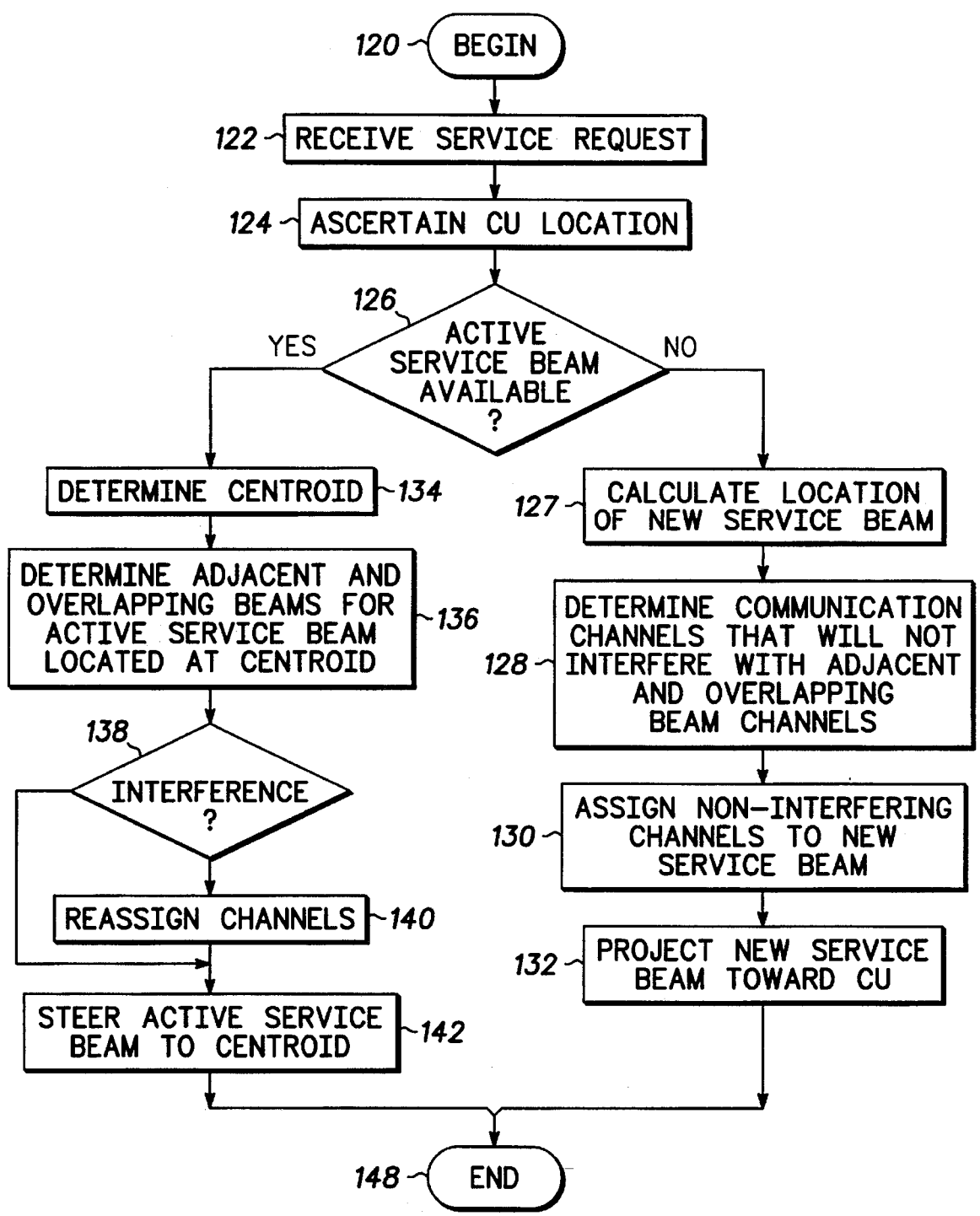
FIG. 10 illustrates a flowchart of a method for adaptively pointing a service beam in response to a new service request in accordance with a preferred embodiment of the present invention.

FIG. 10 illustrates a flowchart of a method for adaptively pointing a service beam in response to a new service request in accordance with a preferred embodiment of the present invention. In a preferred embodiment, all steps of the method except the steering and projecting steps 132, 142 are performed by an NCF (e.g., NCF 34, FIG. 3). In alternate embodiments any or all steps can be performed by a satellite or another computational device.

The method begins 120 when a service request is received from a CU (the "requesting CU") in step 122. The system then ascertains the CU location in step 124. In a preferred embodiment, CU location is ascertained from a message sent to the NCF by the CU requesting service. The CU can determine its location using any common method, including geolocation, for example.

Next, the NCF determines in step 126 whether an active service beam is available to service the requesting CU. An active service beam might be incapable of servicing the requesting CU for several masons. First, the active service beam might not be able to be moved to encompass the requesting CU without losing coverage for other CUs the active service beam is currently servicing ("currently serviced CUs"). In a preferred embodiment, an active service beam is unavailable if its movement will exclude currently serviced CUs. In an alternate embodiment, the NCF can identify one or more of the currently serviced CUs whose service it will terminate so that the active service beam can be moved to encompass the requesting CU. This feature might be desirable, for example, in a communication system where a requesting CU has a higher usage priority than a currently serviced CU.

To determine whether an active service beam may be moved to encompass the requesting CU, the system determines the centroid of the communication unit and the currently serviced CUs. Then, distances between the centroid and each of the requesting CU and currently serviced CUs are calculated. The maximum distance of any CU from the centroid is determined. If the maximum distance exceeds the radius of the active service beam, the active service beam is considered incapable of servicing the requesting CU.

An active service beam might also be incapable of servicing the requesting CU if the active service beam does not have enough channel capacity to service the requesting CU. The NCF computes the number of channels that the active service beam will be required to support if a new channel is added. Then, the NCF decides whether the number of channels will exceed the maximum channel capacity of the active service beam. If so, the active service beam is determined to be unavailable. Otherwise, the active service beam may be available.

When an active service beam is not available, the NCF calculates the location of a new service beam whose center will be directed toward the requesting CU in step 127. Next, the NCF in step 128 determines communication channels that will not interfere with communication channels in service beams that will overlap or be adjacent to the new service beam. In step 130, the NCF assigns the non-interfering channels to the new service beam.

A satellite then projects the new service beam toward the requesting CU in step 132. In a preferred embodiment, the center of the new service beam coincides with the location of the requesting CU. If multiple requesting CUs exist, the center coincides with a ground position aim point (e.g., the centroid) that will allow service to all of the multiple requesting CUs. The method ends in step 148.

In a preferred embodiment, when an active service beam is available to service the requesting CU, the NCF in step 134 determines the centroid of all CUs serviced by the active service beam, including the requesting CU. In step 136, the NCF determines service beams that the active service beam will be adjacent to or will overlap when the active service beam center is moved to the centroid. If overlapping and adjacent service beams exist, the NCF determines in step 138 whether communication channels of the adjacent or overlapping service beams will interfere with communication channels of the active service beam. If so, in step 140, the NCF reassigns channels of the active service beam, the adjacent service beam, and/or the overlapping service beam so that no interfering channels will exist.

In a preferred embodiment, the NCF sends a message to the satellite that contains information necessary for the satellite to steer the active service beam toward the centroid. If necessary, the message can also contain channel reassignment information. In an alternate embodiment where the satellite performs the calculations, there is no need to send the centroid information to the satellite. In step 142, the satellite steers the active service beam to the centroid. The method then ends in step 148.

Although in a preferred embodiment the centroid is used as the aim point of the service beam boresight, in alternate embodiments, any ground position aim point that encompasses all CUs can be used.

In a preferred embodiment, the antenna that projects the service beam is located on board a satellite that moves with respect to the surface of the earth. Therefore, to keep an active service beam pointed toward a centroid, the active service beam must track the aim point as the satellite moves. Additionally, before a satellite moves out of range of the aim point, the calls being supported by the satellite should be handed off to one or more satellites within range of the aim point. In alternate embodiments, the antenna can be located on board a geostationary satellite or on a terrestrial tower. In these alternate embodiments, it is not necessary to compensate for motion of the antenna.

Figure 11:
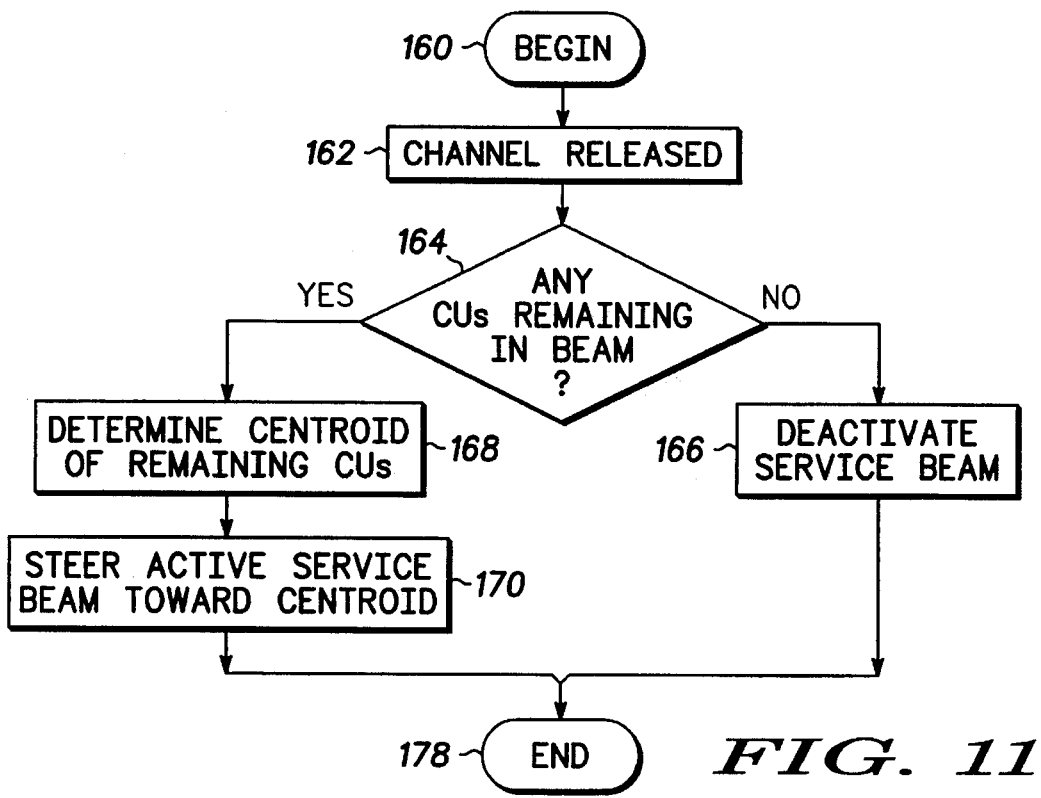
FIG. 11 illustrates a flowchart of a method for deactivating or repositioning a service beam in response to a released channel in accordance with a preferred embodiment of the present invention.

FIG. 11 illustrates a flowchart of a method for deactivating or repositioning a service beam in response to a released channel in accordance with a preferred embodiment of the present invention. The method begins 160 when a channel is released by a CU (the "terminating CU") in step 162. A channel might be released when a user of the CU intentionally terminates the call, or when the CU is located in an area where the link margin of the communication system is not sufficient to overcome physical obstructions, for example.

The NCF in step 164 determines whether any other CUs continue to communicate using the active service beam that was servicing the terminating CU. When no CUs remain in the active service beam, the active service beam is deactivated in step 166. When at least one CU remains in the active service beam, the NCF determines the centroid of the remaining CUs in step 168. The satellite then steers the active service beam toward the centroid in step 170. The procedure ends in step 178.

Figure 12:
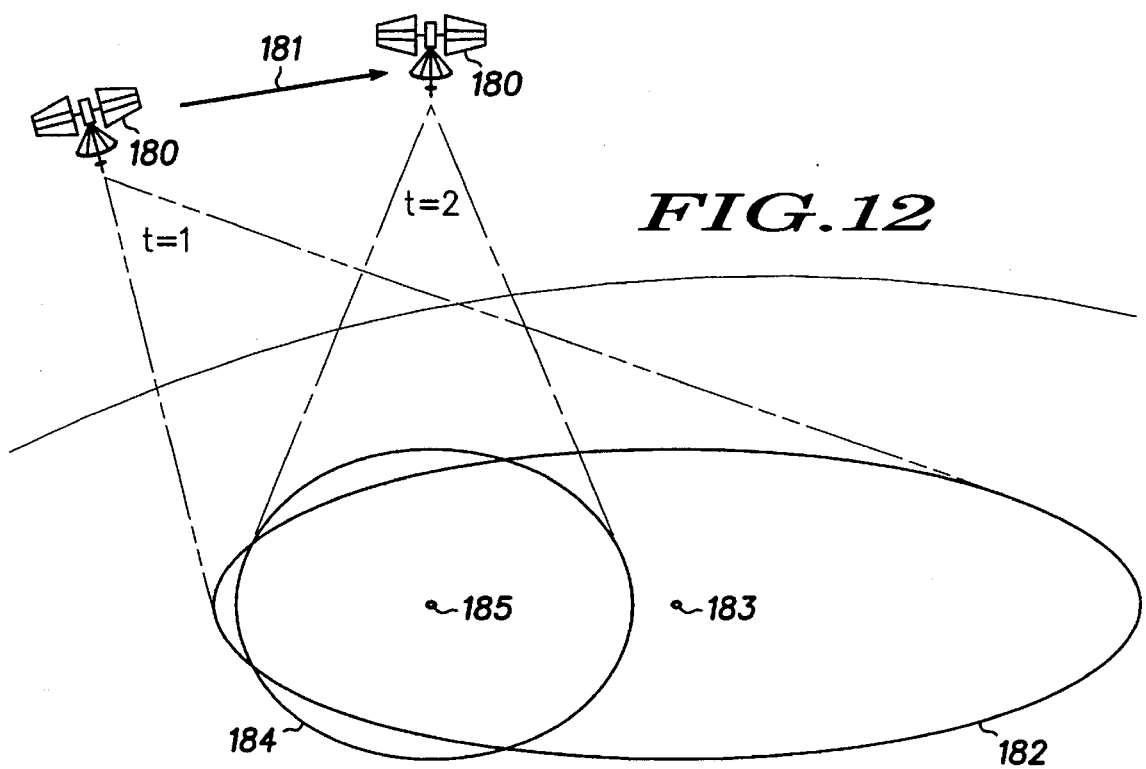
FIG. 12 illustrates beam shape changes as a satellite progresses in its orbit in accordance with a preferred embodiment of the present invention.

As a satellite moves in its orbit, a beam that the satellite points toward a particular ground position aim point will change shape. At a low angle of elevation with respect to the ground position aim point, the shape of the beam will be elliptical. At a high angle of elevation (e.g., directly overhead), the beam shape will be nearly circular. FIG. 12 illustrates beam shape changes as a satellite progresses in its orbit in accordance with a preferred embodiment of the present invention. At time=1, satellite 180 projects a beam within elliptical area 182 having centroid 183. At time=2, after satellite 180 has traveled along path 181, satellite 180 projects a beam within circular area 184 having centroid 185. Because the shape of the beam changes with satellite position, the coverage area also changes. If the satellite's ground position aim point does not change as the coverage area changes, some CUs might fall outside the active service beam in which they were communicating. For this reason, a satellite might not always want to direct the center of a service beam directly at the centroid of users.

Figure 13:
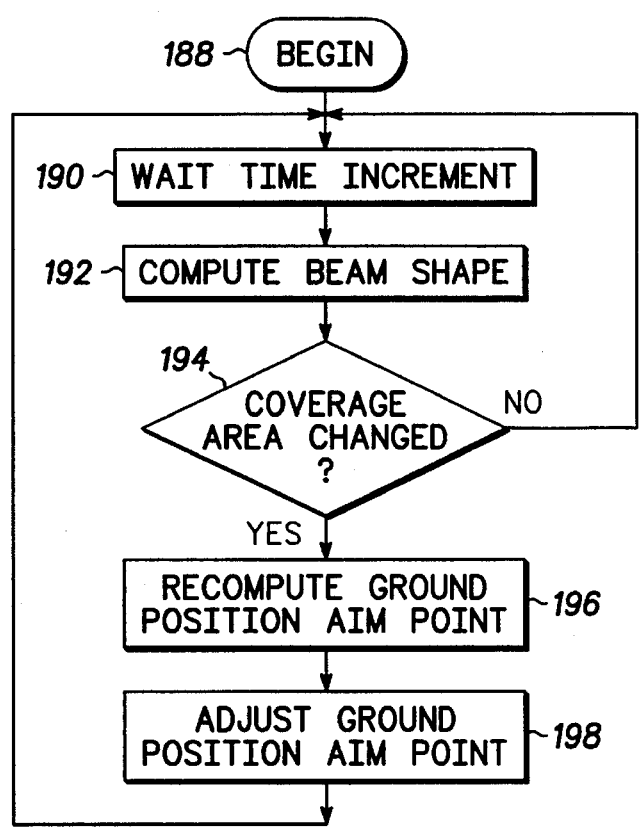
FIG. 13 illustrates a flowchart of a method of adjusting a beam pointing direction as the beam shape changes in accordance with a preferred embodiment of the present invention.

FIG. 13 illustrates a flowchart of a method of adjusting a beam pointing direction as the beam shape changes in accordance with a preferred embodiment of the present invention. The method begins 188 after the system waits an arbitrary time increment in step 190 (e.g., 10 seconds). The system then computes an active service beam shape in step 192 for a time in the near future. Because the position of the satellite with respect to the ground position aim point can be calculated by the system, the approximate shape of an active service beam also can be computed. A determination is made in step 194 whether the coverage area of the active service beam will change so as to exclude CUs being serviced by the active service beam. When the coverage area will affect CU service, the system recomputes the ground position aim point in step 196 so that the active service beam will not exclude the CUs. Then the satellite adjusts the ground position aim point in step 198 to coincide with the recomputed ground position aim point. The method then iterates as shown in FIG. 13.

Figure 14:
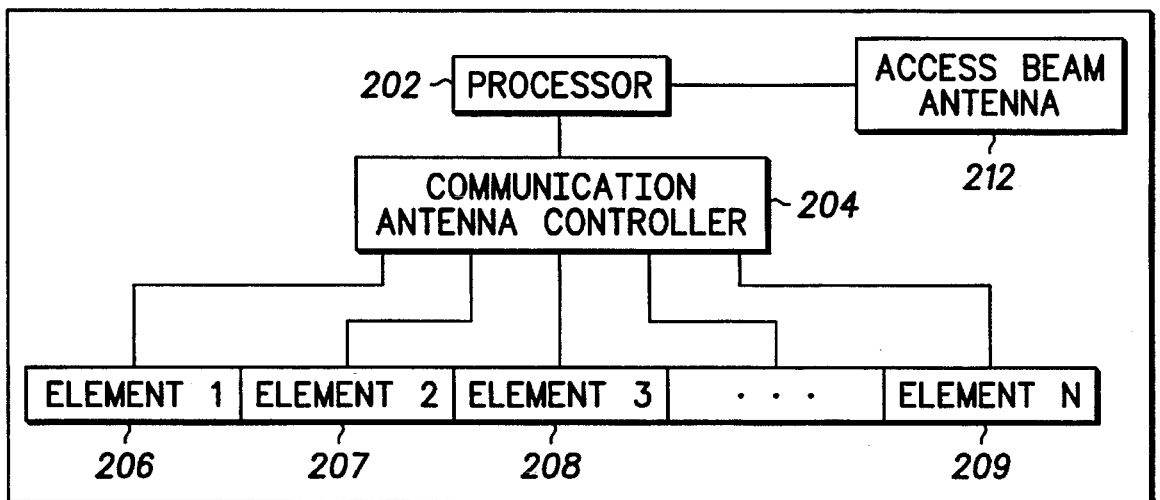
FIG. 14 illustrates a communication antenna apparatus in accordance with a preferred embodiment of the present invention.

FIG. 14 illustrates communication antenna apparatus 200 in accordance with a preferred embodiment of the present invention. In a preferred embodiment, communication antenna apparatus 200 resides on board a satellite. In alternate embodiments, communication antenna apparatus 200 can reside on a terrestrial tower. Communication antenna apparatus 200 includes processor 202, communication antenna controller 204, at least one steerable antenna element 206–209, and an access beam antenna 212.

Access beam antenna 212 projects an access beam toward the earth, and receives service requests from CUs. Access beam antenna 212 can project a satellite-fixed beam or a steerable beam. Access beam antenna 212 sends the service request to processor 202. In a preferred embodiment, processor 202 initiates communication of relevant information to the NCF, which then performs most of the calculations shown in FIG. 10. In alternate embodiments, processor 202 performs some or all of the calculations shown in FIG. 10. After the system determines whether to provide a new service beam or to reposition an active service beam, communication antenna controller 204 controls steerable antenna elements 206–209 to provide the new service beam or to reposition the active service beam, if necessary. Steerable antenna elements 206–209 can be steered independently from each other and are desirably electronically steerable elements. In an alternate embodiment, steerable antenna elements 206–209 can be mechanically steerable elements. The number of steerable antenna elements 206–209 depends on the communication system and can range from a single element to hundreds of elements.

Figure 15:
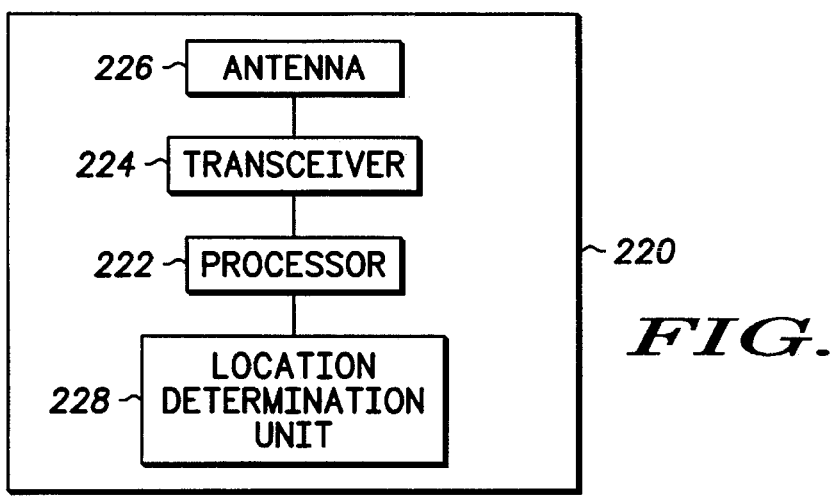
FIG. 15 illustrates a communication unit in accordance with a preferred embodiment of the present invention.

FIG. 15 illustrates a communication unit 220 (CU) in accordance with a preferred embodiment of the present invention. CU 220 can be a portable cellular telephone, pager, or facsimile device, for example. CU 220 includes processor 222, transceiver 224, and antenna 226. In a preferred embodiment, CU 220 also includes location determination unit 228. Processor 222 receives indications from a user interface or computer (not shown) that indicates that CU 220 should make a service request. Processor 222 then makes the service request using transceiver 224 and antenna 226. The service request is made to a communication antenna (e.g., on a satellite) in whose access beam CU 220 is located. Transceiver 224 communicates over an active service beam or a new service beam provided by the communication antenna as described in conjunction with FIG. 10.

In a preferred embodiment, location determination unit 228 calculates the location of CU 220. This location information is desirably transmitted along with the service request. Location determination unit 228 can be, for example, a geolocation device or some other device that determines location using triangularization. In alternate embodiments, the location of CU 220 can be determined from registration information stored elsewhere in the system.

Figure 16:
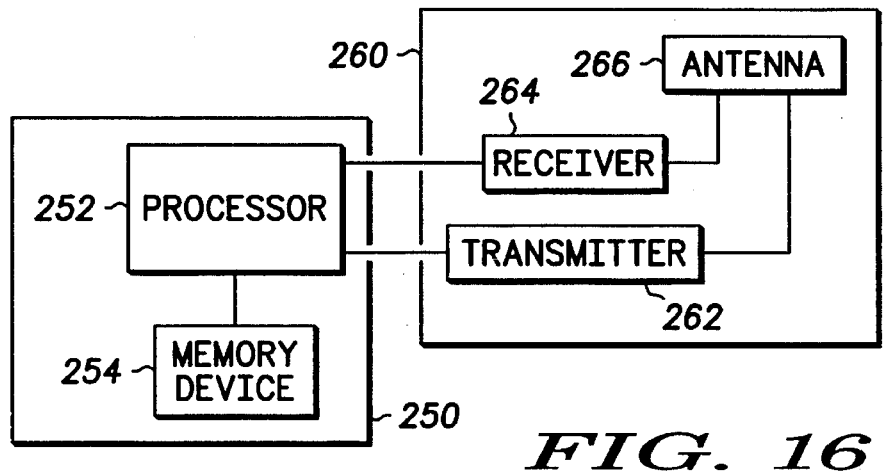
FIG. 16 illustrates a Network Control Facility in accordance with a preferred embodiment of the present invention.

FIG. 16 illustrates a Network Control Facility 250 (NCF) in accordance with a preferred embodiment of the present invention. NCF 250 includes processor 252 and memory device 254. Processor 252 ascertains the location of a CU that has requested service from the communication system, and determines whether to provide a new service beam to the CU or to steer an active service beam to a location that will provide service to the CU. The calculations performed by processor 252 are described in detail in conjunction with FIGS. 10, 11, and 13. Memory device 254 is used to store information necessary to perform the calculations.

In a preferred embodiment, NCF 250 communicates with satellites using radio-communication device 260 which can be co-located with NCF 250 or remote from NCF 250. Radio-communication device 260 includes transmitter 262, receiver 264, and antenna 266. Receiver 264 receives a service request through antenna 266 and communicates this service request to processor 252. Once NCF 250 performs the necessary calculations, a message that tells the communication antenna how to provide service to the requesting CU is sent to the communication antenna using transmitter 262 and antenna 266.

In an alternate embodiment, where the communication antenna is located on a terrestrial tower, radio-communication device 260 might not be necessary, and a hard-wired link between NCF 250 and the communication antenna can suffice.

In summary, the method and apparatus of the present invention provides, among other things, an RF communication system where service beams are provided on a demand basis. In a preferred embodiment, an active service beam is steered toward a centroid of CUs. When no service beam is available or CUs cannot be serviced by a currently active service beam because the beam's capacity is exceeded or the geographic coverage of the beam is unable to include the CUs, new service beams are projected toward the CUs. Preferably, only those beams that are necessary to service the CUs are active at a given time, thus conserving power and reducing unnecessary transmissions of RF energy. Unlike prior art systems, the method and apparatus of the present invention provide variable coverage capacity and substantial power savings by using independently steerable service beams that are responsive to CU demands.

The method and apparatus of the present invention differs from the prior art in several important respects. First, service beams are not always turned on as in prior art systems. Thus, substantial power savings can be realized. Second, the method and apparatus of the present invention determines a centroid of CUs and tracks that centroid as the number of CUs being serviced by a service beam changes. Centroid tracking enables the system to better service a larger number of CUs. Third, the method and apparatus of the present invention involves independently steering the service beams that a satellite provides, rather than the prior-art method of steering the entire cellular footprint. This allows the system to better target high-demand areas, and also enables a satellite to project multiple service beams toward an area of very high-demand. Fourth, unlike prior-art systems which aim their satellite footprints toward an earth-fixed area that has been predetermined by the system, the method and apparatus of the present invention steers service beams to any area in real-time. This provides the advantage of targeting areas in response to actual user demand, thus decreasing the likelihood that users in busy areas will be unable to access the system.

What is claimed is:

1. A method for a communication system to provide service to a requesting communication unit, wherein an active service beam projected by a communication antenna services one or more currently serviced communication units, the method comprising the steps of:

a) receiving, by the communication antenna, a service request from the requesting communication unit;

b) ascertaining a location of the requesting communication unit in response to the service request;

c) determining, based on the location, a ground position aim point for a center of the active service beam that would allow the active service beam to service the requesting communication unit without excluding any of the one or more currently serviced communication units;

d) steering the center of the active service beam to substantially coincide with the ground position aim point; and e) when the ground position aim point will not allow the active service beam to service the requesting communication unit and the one or more currently serviced communication units simultaneously, projecting a new service beam toward the requesting communication unit.

2. The method as claimed in claim 1, further comprising the steps of:

f) determining whether another active service beam intersects the active service beam when the center substantially coincides with the ground position aim point;

g) when the another active service beam does intersect the active service beam, determining first channels assigned to the another active service beam;

h) ascertaining whether second channels of the active service beam will interfere with the first channels when the center of the active service beam substantially coincides with the ground position aim point; and i) when the second channels will interfere with the first channels, reassigning channels so that the second channels will not interfere with the first channels.

3. The method as claimed in claim 1 further comprising the steps of:

f) determining whether a call from a particular communication unit being serviced by the active service beam has ended;

g) determining whether at least one remaining communication unit continues to be serviced by the active service beam; and p1 h) when the at least one remaining communication unit does not continue to be serviced by the active service beam, turning off the active service beam.

4. A method for a communication system to provide service beams to communication units, the method comprising the steps of:

a) receiving a service request from a communication unit;

b) ascertaining a location of the communication unit in response to the service request;

c) determining, in response to the service request, whether an active service beam of the service beams is capable of servicing the communication unit based on the location; and d) when the active service beam is capable of servicing the communication unit, determining a beam location for the active service beam which would enable the active service beam to provide service to the communication unit and steering the active service beam, in response to the service request, to the beam location that allows the active service beam to provide the service to the communication unit.

5. The method as claimed in claim 4, wherein the active service beam provides service to one or more currently serviced communication units and the step c) of determining comprises the steps of:

c1) computing whether the active service beam could be steered to service the communication unit at the location without excluding any of the one or more currently serviced communication units;

c2) when the active service beam could not be steered to service the communication unit without excluding any of the one or more currently serviced communication units, determining that the active service beam is not capable of servicing the communication unit; and c3) when the active service beam could be steered to service the communication unit without excluding any of the one or more currently serviced communication units, determining that the active service beam is capable of servicing the communication unit.

6. The method as claimed in claim 4, wherein the active service beam provides the service to one or more currently serviced communication units and the step c) of determining comprises the steps of:

c1) computing whether the active service beam could be steered to service the communication unit at the location without excluding any of the one or more currently serviced communication units;

c2) when the active service beam could be steered to service the communication unit without excluding any of the one or more currently serviced communication units, determining that the active service beam is capable of servicing the communication unit; and c3) when the active service beam could not be steered to service the communication unit without excluding any of the one or more currently serviced communication units, identifying at least one of the one or more currently serviced communication units who will not be serviced by the active service beam and determining that the active service beam is capable of servicing the communication unit.

7. The method as claimed in claim 4, wherein the step c) of determining comprises the steps of:

c1) computing a number of channels that will be used in the active service beam when the active service beam is used to provide a new channel to the communication unit at the location;

c2) deciding whether the number of channels will exceed a maximum channel capacity of the active service beam;

c3) when the number of channels will exceed the maximum channel capacity, determining that the active service beam is not capable of servicing the communication unit; and c4) when the number of channels will not exceed the maximum channel capacity, determining that the active service beam is capable of servicing the communication unit.

8. The method as claimed in claim 4, wherein the active service beam is currently servicing one or more currently serviced communication units and the step c) of determining comprises the steps of:

c1) determining a centroid of the communication unit and the one or more currently serviced communication units;

c2) calculating distances between the centroid and the communication unit, and the centroid and each of the one or more currently serviced communication units;

c3) determining which of the distances is a maximum distance from the centroid;

c4) evaluating whether the maximum distance is greater than a radius of the active service beam;

c5) when the maximum distance is greater than the radius, determining that the active service beam is not capable of servicing the communication unit; and c6) when the maximum distance is not greater than the radius, determining that the active service beam is capable of servicing the communication unit.

9. The method as claimed in claim 4, wherein the active service beam provides service to one or more currently serviced communication units and the step d) of steering the active service beam comprises the steps of:

d1) determining a ground position aim point that would allow the active service beam to service the communication unit and the one or more currently serviced communication units; and d2) steering the active service beam to a beam location so that a center of the active service beam substantially coincides with the ground position aim point.

10. The method as claimed in claim 9, wherein the step d1) of determining the ground position aim point comprises the step of determining the ground position aim point as a centroid of the communication unit and the one or more currently serviced communication units.

11. The method as claimed in claim 9, further comprising the steps of:

d3) determining whether adjacent active beams and overlapping active beams exist with respect to the beam location;

d4) when the adjacent active beams and the overlapping active beams exist, determining first channels assigned to the adjacent active beams and the overlapping active beams;

d5) ascertaining whether second channels of the active service beam will interfere with the first channels when the active service beam is projected within the beam location; and d6) when the second channels will interfere with the first channels, reassigning channels so that the second channels will not interfere with the first channels.

12. The method as claimed in claim 9, wherein the active service beam is projected by a communication antenna located on a communication satellite which moves with respect to the communication unit, the method further comprising the step of further steering the active service beam toward the ground position aim point as the communication satellite moves.

13. The method as claimed in claim 12 further comprising the step of handing off calls supported by the active service beam to at least one other satellite when the communication satellite will soon be out of range of the ground position aim point.

14. The method as claimed in claim 12, wherein the active service beam supports calls from the one or more currently serviced communication units, the method further comprising the steps of:

e) periodically computing a beam shape of the active service beam, wherein the beam shape describes the beam shape as a function of a position of the communication satellite within an orbit at a future time;

f) determining whether a coverage area of the active service beam will change because of the beam shape causing any of the calls supported by the active service beam to be dropped;

g) when the coverage area will change, computing a new ground position aim point so that none of the calls will be dropped; and h) adjusting the ground position aim point to the new ground position aim point at the future time.

15. The method as claimed in claim 4, further comprising the step e) of projecting a new service beam toward the communication unit when the active service beam is not capable of servicing the communication unit based on the location.

16. The method as claimed in claim 15, wherein the step e) of projecting the new service beam comprises the step of activating the new service beam so that a center of the new service beam substantially coincides with the location of the communication unit.

17. The method as claimed in claim 15, wherein the step of projecting the new service beam comprises the steps of:

e1) calculating a new service beam location;

e2) determining adjacent active beams and overlapping active beams with respect to the new service beam location;

e3) determining first channels that will not interfere with second channels assigned to the adjacent active beams and the overlapping active beams;

e4) assigning the first channels to the new service beam; and e5) projecting the new service beam with the first channels.

18. The method as claimed, in claim 4 further comprising the steps of:

e) determining that the communication unit being serviced by the active service beam has released a communication channel;

f) determining whether one or more currently serviced communication units continue to be serviced by the active service beam; and g) when the one or more currently serviced communication units do not continue to be serviced by the active service beam, deactivating the active service beam.

19. The method as claimed in claim 18 further comprising the steps of:

h) when the one or more currently serviced communication units continue to be serviced by the active service beam, determining a ground position aim point that would allow the active service beam to service the one or more currently serviced communication units; and i) steering the active service beam to a beam location so that a center of the active service beam substantially coincides with the ground position aim point.

20. The method as claimed in claim 19, wherein the step h) of determining the ground position aim point comprises the step of determining the ground position aim point as a centroid of the one or more currently serviced communication units.

21. A method for a communication system to provide service beams to communication units, the method comprising the steps of:

a) projecting a new service beam toward a communication unit that has requested service, wherein the projecting step is performed when an active service beam is not capable of providing service to the communication unit because of a location of the communication unit relative to one or more currently serviced communication units, and wherein the active service beam provides the service to the one or more currently serviced communication units; and b) using the active service beam to provide the service to the communication unit when the active service beam is capable of providing the service to the communication unit, wherein a center of the active service beam is steered to a ground position aim point that allows the active service beam to service the communication unit and the one or more currently serviced communication units.

22. The method as claimed in claim 21, wherein the step a) of projecting the new service beam comprises the step of activating the new service beam so that a center of the new service beam substantially coincides with the location of the communication unit.

23. The method as claimed in claim 21, wherein multiple requesting communication units request service, and the step a) of projecting the new service beam comprises the step of projecting the new service beam toward the ground position aim point that allows the new service beam to service the multiple requesting communication units.

24. The method as claimed in claim 21, wherein the step b) of using the active service beam comprises the step of steering the active service beam to a beam location so that the center of the active service beam substantially coincides with a centroid of the communication unit and the one or more currently serviced communication units.

25. A method for a communication system to provide service beams to communication units, the method comprising the steps of:
   a) ascertaining a location of a communication unit that has requested service from the communication system, wherein the communication unit requested the service by sending a service request to the communication system;
   b) determining, in response to the service request, whether an active service beam of the service beams is capable of servicing the communication unit based on the location, wherein the service beams are not fixed with respect to a surface of an earth, but are dynamically steerable based on traffic demand of the communication units;
   c) when the active service beam is not capable of servicing the communication unit, instructing a communication antenna to project a new service beam of the service beams toward the communication unit; and
   d) when the active service beam is capable of servicing the communication unit, instructing the communication antenna to use the active service beam to provide service to the communication unit.

26. The method as claimed in claim 25, wherein the active service beam supports one or more currently serviced communication units and the step d) of instructing the communication antenna to use the active service beam comprises the steps of:
   d1) determining a ground position aim point that allows the active service beam to service the communication unit and the one or more currently serviced communication units; and
   d2) sending a message to the communication antenna to steer the active service beam to a beam location so that a center of the active service beam substantially coincides with the ground position aim point.

27. The method as claimed in claim 26, further comprising the steps of:
   d3) determining whether adjacent active beams and overlapping active beams exist with respect to the beam location;
   d4) when the adjacent active beams and the overlapping active beams exist, determining first channels assigned to the adjacent active beams and the overlapping active beams;
   d5) ascertaining whether second channels of the active service beam will interfere with the first channels; and
   d6) when the second channels will interfere with the first channels, reassigning channels so that the second channels will not interfere with the first channels.

28. A method for a communication unit to communicate with a communication antenna, wherein the communication antenna is controlled by a communication antenna controller coupled to the communication antenna, the method comprising the steps of:

a) sending a service request to the communication antenna controller, the service request including a location of the communication unit;
b) using a new service beam projected by the communication antenna when the location is such that an active service beam is not capable of servicing the communication unit, wherein the active service beam provides service to one or more currently serviced communication units; and
c) using the active service beam projected by the communication antenna when the active service beam is capable of servicing the communication unit without losing service to the one or more currently serviced communication units, wherein a center of the active service beam is steered to a ground position aim point that allows the active service beam to service the communication unit and the one or more currently serviced communication units.

29. A communication antenna apparatus comprising:
   a communication antenna controller for controlling a first steerable antenna element and at least one second steerable antenna element;
   the first steerable antenna element coupled to the communication antenna controller, the first steerable antenna element for projecting an active service beam toward one or more currently serviced communication units which the active service beam is servicing and, when the active service beam can be moved to service a new communication unit which has requested service without losing service to any of the one or more currently serviced communication units, the first steerable antenna element for steering a center of the active service beam to a ground position aim point that allows service to the new communication unit and the one or more currently serviced communication units; and
   the at least one second steerable antenna element coupled to the communication antenna controller, the at least one second steerable antenna element for projecting a new service beam toward the new communication unit when the active service beam is not capable of servicing the new communication unit without losing service to the one or more currently serviced communication units.

30. A network control facility comprising:
   a processor for ascertaining a location of a communication unit in response to a service request, from the communication unit, for service from a communication antenna, determining whether an active service beam provided by the communication antenna is capable of servicing the communication unit based on the location, wherein the active service beam is not fixed with respect to a surface of an earth, but is dynamically steerable based on traffic demand of communication units, when the active service beam is not capable of servicing the communication unit, instructing the communication antenna to project a new service beam toward the communication unit, and when the active service beam is capable of servicing the communication unit, instructing the communication antenna to use the active service beam to provide the service to the communication unit.

31. The network control facility as claimed in claim 30, wherein the communication antenna is located on-board a satellite, the network control facility further comprising
   a transceiver coupled to the processor for sending instructions to the satellite indicating how the satellite should control the active service beam and the new service beam.

32. A communication unit comprising:

a processor for creating a service request; and a transceiver coupled to the processor for sending the service request and for communicating over a new service beam provided by a communication antenna when an active service beam is not capable of servicing the communication unit based on a location of the communication unit, wherein the active service beam is providing service to one or more currently serviced communication units, the transceiver also for using the active service beam when the active service beam is capable of servicing the communication unit, wherein a center of the active service beam is steered by the communication antenna to a ground position aim point that allows the active service beam to service the communication unit and the one or more currently serviced communication units.

33. The communication unit as claimed in claim 32, further comprising a location determination unit coupled to the processor for determining the location of the communication unit so that a determination can be made by a network control facility whether the active service beam is capable of servicing the communication unit.

\* \* \* \* \*

UNITED STATES PATENT AND TRADEMARK OFFICE
CERTIFICATE OF CORRECTION

PATENT NO. : 5,612,701
DATED : March 18, 1997
INVENTOR(S) : Dennis P. Diekelman

It is certified that error appears in the above-identified patent and that said Letters Patent is hereby corrected as shown below:

In column 11, claim 3, line 29, delete "p1" and start the next line with "h)".

In column 16, claim 29, lines 21 and 25, delete "dement" and insert --element--.

Signed and Sealed this

Ninth Day of September, 1997

*Attest:*

BRUCE LEHMAN

*Attesting Officer*  Commissioner of Patents and Trademarks